Patented Feb. 13, 1923.

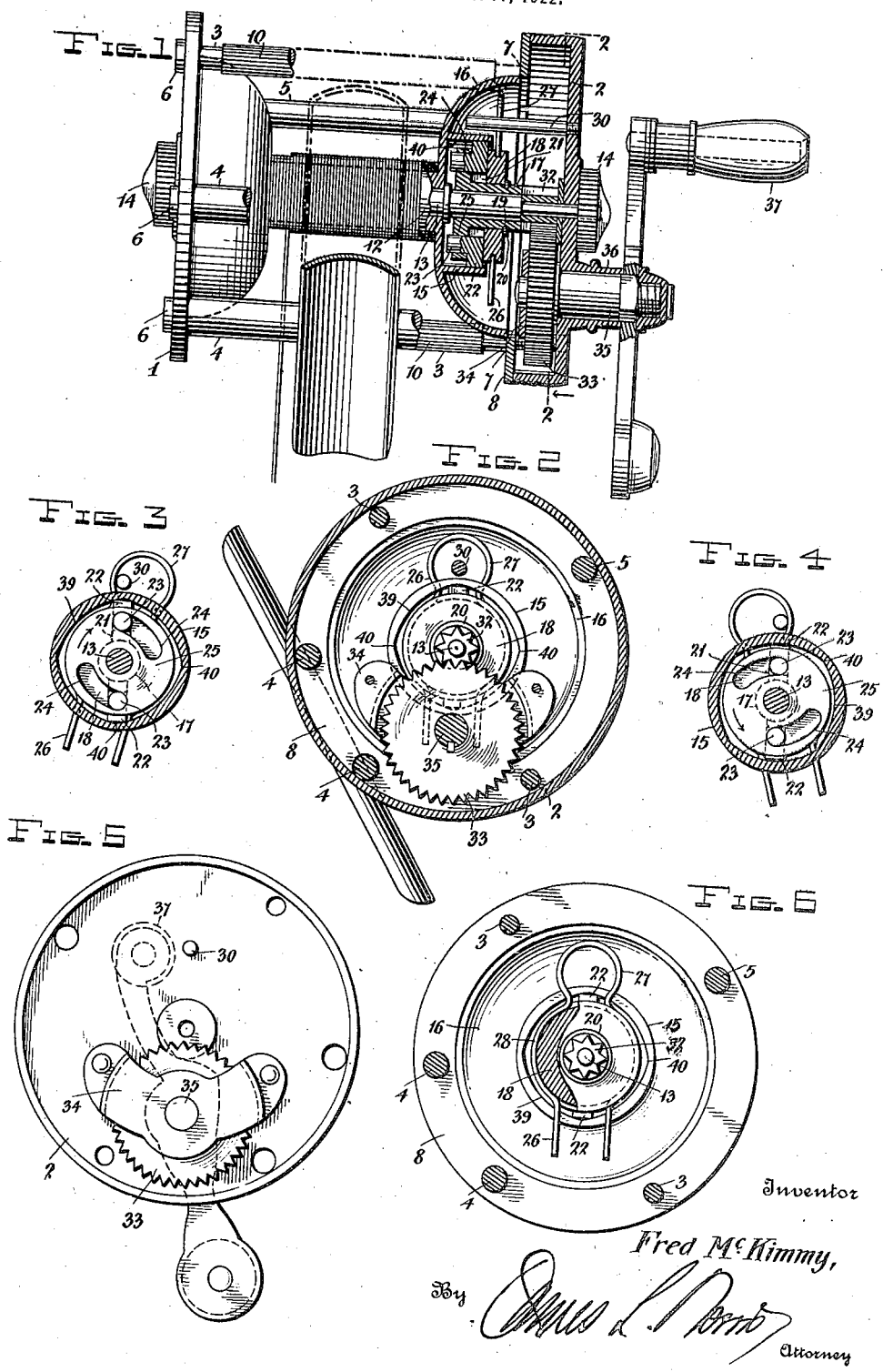

1,445,525

UNITED STATES PATENT OFFICE.

FRED McKIMMY, OF BEAVERDAM, OHIO.

FISHING REEL.

Application filed February 11, 1922. Serial No. 535,899.

*To all whom it may concern:*

Be it known that I, FRED McKIMMY, a citizen of the United States, residing at Beaverdam, in the county of Allen and State of Ohio, have invented new and useful Improvements in Fishing Reels, of which the following is a specification.

This invention relates to fishing reels and proposes the construction of a device of this character which embodies novel features of construction whereby the spool is automatically disengaged from the winding mechanism when rotated in an unwinding direction so as to impart a substantially frictionless resistance to the paying out of the line, in the act of casting.

One of the objects of the invention is the provision of a spool having the spindle thereof journalled in bearings in the end plates of the reel, in the usual manner, with clutch means rotatably mounted upon said spindle, and having the bearing surface thereof confined to that portion of the spindle which projects outwardly from one of the spool heads.

Another object of the invention is the construction of the spool having an annular clutch ring fixed within the hollow head at one end thereof, and clutch means, seated within said ring and journalled upon the projecting end of the spindle, said clutch means comprising dogs frictionally engageable with the inner circumferential surface of the clutch ring for winding the spool, and being automatically disengaged from the clutch ring when the spool is turned in an unwinding direction.

A further object of the invention is the provision of a friction brake engaging at will with the peripheral portion of the spool head for retarding the speed of rotation of the spool, and preventing back-lash.

Still another object of the invention resides in the specific construction of the clutch mechanism and in the disposition of the parts by which a fishing reel is produced which is comparatively simple and inexpensive in its construction and which is not liable to break or get out of repair.

With the above and other objects in view, my invention consists in the improved fishing reel illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a view in side elevation of a fishing reel, showing the parts which include my invention in cross section.

Figure 2 is an end view taken along the line 2—2 of Figure 1.

Figures 3 and 4 are end views partly in cross section showing the clutch mechanism respectively in engagement with the spool and in disengagement therefrom.

Figure 5 is an inner end view of the hollow end plate with the mechanism thereto attached.

Figure 6 is an end view of the reel with the spool in place, the hollow end plate being removed.

Referring now in detail to the features illustrated in the several figures, the numeral 1 represents the flat end plate of a fishing reel and 2 the hollow end plate which acts as a housing for the operating mechanism, said end plates being connected together by spacing bars 3, 4 and 5. These spacing bars are secured to the plate 1 by means of screws 6 which are threaded into sockets in the ends of said spacing bars. The spacing bars are shouldered as at 7 where they pass through apertures in an annular plate 8, the latter forming a cover for the open side of the hollow reel plate 2. The ends of the spacing bars which are adjacent to the plate 2 pass into apertures formed in said plate, two of said bars being threaded at their ends and engaging threaded apertures in the plate 2. These bars are knurled as at 10 affording a finger hold, by means of which they may be rotated, and they serve as the sole means for securing the heads 1 and 2 detachably together and in fixed spaced relation. Two of the spacing bars 5 are made of stouter stock than the others and have secured thereto the bracket 11 by which the fishing reel is attached to a rod.

The spool 12 is mounted to rotate within the cage formed by the reel heads 1 and 2 and the spacing bars, and comprises a spindle 13 in jeweled bearings 14 carried by the plates 1 and 2. So much of the structure as has been described is old, and is the usual construction in fishing reels.

It is essential to the operation of a fishing reel in paying out the line, as in casting, that the spool be freed from the winding mechanism, in order that the spool shall oppose as little resistance as possible to the force of the cast, but that when the handle of the reel is grasped and moved to wind the spool, the operating mechanism shall at once be put in engagement automatically with the spool to enable the winding of the latter. The means which I have provided for this purpose comprises a clutch ring 15 which is arranged concentrically of the spindle 13 and in fixed relation to the inner surface of the spool head 16. The inner wall of said ring is provided with cam elevations 39 forming between them the depressions 40. Positioned within the clutch ring and journalled upon the projecting end of said spindle is the male member of the clutch which comprises a hub piece 17 upon which is journalled the drum 18. The drum is secured against endwise movement relative to the hub by means of a circumferential groove 19 into which is slipped a split ring 20. The drum is provided with a diametrical channel 21, shown in Figure 1, and which is also indicated in dotted lines in Figures 3 and 4. Within this channel fit radially slidable dogs 22 which are provided with angularly disposed portions 23 arranged axially of said drum and projecting beyond the surface thereof through arcuate slots 24 arranged on opposite sides of the flanged end 25 of the hub 17. These slots are made with an eccentric curvature so that one end of each slot approaches closer to the periphery of the flanged end 25 than the other. When the ends 23 of the dogs 22 are in the outermost ends of the arcuate slots 24 the dogs will be forced outwardly and into frictional engagement with the cam elevations 39 of the clutch ring 15, finding a seat in an opposite pair of the depressions 40 and connecting the clutch ring with the operating mechanism to which the clutch is connected. When the offset ends of the dogs are in the innermost ends of the arcuate slots, the dogs will be retracted, and the clutch ring and spool will be free from engagement with said dogs and with the operating means. In order to permit relative movement between the hub and the clutch drum so as to cause operation of the dogs, it is essential that a sufficient amount of friction be imparted to one of these members to overcome the friction existing between said members which would ordinarily tend to cause them to rotate together. For this purpose the drag spring 26 is provided having an eye 27 at one end and the legs thereof being bowed arcuately as at 28 to frictionally embrace the opposite sides of the clutch drum 18. Said spring is held relatively stationary by means of a pin 30 which is attached to a fixed part of the reel.

The outer end of the hub 17 is provided with a gear 32 which meshes with a larger gear 33, the latter being carried by the end plate 2 and journalled in a frame constituted by said end plate, and an offset strap 35 riveted thereto. The gear wheel 33 is keyed to a shaft 35 which extends through a hollow boss 36 on the outer side of the end plate 2 and to which is secured the operating handle 37.

When the handle 37 is turned in a winding direction, that is, clockwise as viewed from the direction of the arrow in Figure 1, the drag-spring 26 which is anchored against rotation by the pin 30 holds the clutch drum 18 against rotation until the hub 17 has been turned by means of the gear 32 until the arcuate slots 24 move the dogs outwardly into clutching engagement with the depressions in the inner circumferential surface of the clutch ring 15. From this time on, the clutch drum and the hub rotate unitarily against the resistance of said drag spring and turn the spool in a winding direction.

When the spool is rotated in an unwinding direction, it causes the clutch drum to be moved relatively counter-clockwise to the flanged end 25 of the hub causing the recession of the offset ends 23 of the dogs to the inner ends of the arcuate slots, withdrawing said dogs quickly from the engagement with the inner surface of the clutch ring 15 and releasing the spool from the operating mechanism, permitting its free rotation. It will be observed that the hub 17 is freely journalled upon only a small portion of the spindle 13 and therefore the spool will be under but a slight frictional resistance due to this cause.

The clutch mechanism is assembled without the use of screws or rivets, the several parts thereof being held in place solely by the split ring 20, and when so assembled it is impossible for the dogs to become loosened or displaced. This feature alone makes for simplicity and reliability of operation and reduces materially the cost of manufacturing the device.

It is obvious that various changes may be made in the details of construction without departing from the invention and it is therefore to be understood that this invention is not to be limited to the specific construction shown and described.

Having described my invention what I claim as new and desire to secure by Letters Patent, is:—

1. A fishing reel comprising a spool, an end plate, a spindle fixed to said spool and journalled in said end plate, an operating gear, a clutch ring fixed to said spool, a clutch cooperating with said clutch ring, said clutch comprising a hub having a flanged end and provided with means engaging said operating gear, a drum journalled on said hub and having a channeled face forming with the flanged end of said hub a housing, dogs mounted within said housing, said drum being secured against end movement relative to said flanged end by a split ring seated in a groove in said hub.

2. A fishing reel comprising a spool, an end plate, a spindle fixed to said spool and journalled in said end plate, an operating gear, a clutch ring fixed to said spool, a clutch having a portion seated within said clutch ring, said clutch comprising a hub, means on said hub engaging said operating gear, said hub having a flanged end provided with a pair of oppositely arranged arcuate slots having an eccentric curvature, a drum journalled on said hub and having a diametrically channeled face forming with with the flanged end of said hub a housing, dogs having portions slidably movable in the opposite ends of said housing, and having offset portions projecting into said arcuate slots, said dogs being engageable with the surface of said clutch ring, and means for causing relative rotation between said drum and hub.

3. A fishing reel comprising a spool, an end plate, a spindle fixed to said spool and journalled in said end plate, an operating gear, a clutch ring fixed to said spool, a clutch having a portion thereof seated in said ring, said clutch comprising a hub, means on said hub engaging said operating gear, said hub having a flanged end provided with a pair of oppositely arranged arcuate slots having an eccentric curvature, a drum journalled on said hub having a diametrically channeled face, forming with the flanged end of said hub a housing, dogs having portions slidably movable in opposite ends of said housing, and having offset portions projecting into said arcuate slots, said dogs being engageable with the surface of said clutch ring, a drag spring engageable with said drum for permitting relative rotation of said drum and hub and means for holding said drag spring against rotation.

4. A fishing reel comprising a spool, an end plate, a spindle fixed to said spool and journalled in said end plate, an operating gear, a clutch ring fixed to said spool, provided on its inner peripheral wall with cam elevations, having depressions therebetween, a clutch, having a portion thereof seated within said ring, said clutch comprising a hub, means on said hub engaging said operating gear, said hub having a flanged end provided with a pair of oppositely arranged arcuate slots having an eccentric curvature, a drum journalled on said hub, having a diametrically channelled face, forming with the flanged end of said hub a housing, and dogs having portions slidably movable in opposite ends of said housing, and having offset portions projecting into said arcuate slots, said dogs being engageable with said depressions between the cam elevations of said clutch ring.

In testimony whereof I have hereunto set my hand in presence of two subscribing witnesses.

FRED McKIMMY.

Witnesses:
J. C. YAUT,
NOAH DANNER.